US012100032B2

(12) United States Patent
Nakazawa et al.

(10) Patent No.: US 12,100,032 B2
(45) Date of Patent: Sep. 24, 2024

(54) LEARNING DEVICE, COMPUTER-READABLE INFORMATION STORAGE MEDIUM, AND LEARNING METHOD

(71) Applicant: RAKUTEN GROUP, INC., Tokyo (JP)

(72) Inventors: Mitsuru Nakazawa, Tokyo (JP); Takashi Tomooka, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 372 days.

(21) Appl. No.: 17/645,445

(22) Filed: Dec. 21, 2021

(65) Prior Publication Data

US 2022/0207584 A1    Jun. 30, 2022

(30) Foreign Application Priority Data

Dec. 28, 2020   (JP) ................................ 2020-219436

(51) Int. Cl.
*G06Q 30/00*       (2023.01)
*G06N 20/00*       (2019.01)
*G06Q 30/0601*     (2023.01)

(52) U.S. Cl.
CPC ......... *G06Q 30/0623* (2013.01); *G06N 20/00* (2019.01)

(58) Field of Classification Search
CPC .............................................. G06Q 30/06–08
See application file for complete search history.

(56) References Cited

U.S. PATENT DOCUMENTS 7,802,200 B1 *  9/2010  Siegel ............... G06Q 30/0633
                                                        705/26.8
10,885,470 B2 *  1/2021  Baker ................... G06N 3/045
(Continued)

FOREIGN PATENT DOCUMENTS

JP    2014115912 A    6/2014
JP    2019003270 A    1/2019
(Continued)

OTHER PUBLICATIONS

Office Action of Jan. 25, 2022, for corresponding JP Patent Application No. 2020-219436 with English translation, pp. 1-6.
(Continued)

*Primary Examiner* — Ethan D Civan
(74) *Attorney, Agent, or Firm* — HEA LAW PLLC

(57) ABSTRACT

To determine whether product information provided from a seller is consistent, provided is a learning device including at least one processor, the at least one processor being configured to: acquire first and second product information from a storage in which a plurality of pieces of product information each including a plurality of pieces of item data relating to a product are stored in advance; generate third product information in which at least one piece of item data included in the first product information is replaced with the corresponding at least one piece of item data of the second product information; and cause a machine learning model to learn the third product information as inconsistent product information, wherein the machine learning model is configured to determine, when a piece of product information is input, whether the piece of product information is consistent.

7 Claims, 9 Drawing Sheets

FIRST DATA SET

| DATA NAME | CORRECT -ANSWER DATA | PRODUCT IMAGE | | PRICE | STATE | PRODUCT NAME/ PRODUCT INTRODUCTION | | CATEGORY | |
|---|---|---|---|---|---|---|---|---|---|
| | | DATA | CORRECT -ANSWER DATA | | | DATA | CORRECT -ANSWER DATA | DATA | CORRECT -ANSWER DATA |
| FIRST PRODUCT INFORMATION | 0.0 | aaa.bmp | 0.0 | 50,000 | GOOD | aaa.txt | 0.0 | SMARTPHONE | 0.0 |
| SECOND PRODUCT INFORMATION | 0.0 | bbb.bmp | 0.0 | 80,000 | POOR | bbb.txt | 0.0 | TELEVISION | 0.0 |
| ... | ... | ... | ... | ... | ... | ... | ... | ... | ... |
| n-TH PRODUCT INFORMATION | ... | ... | ... | ... | ... | ... | ... | ... | ... |

(56) References Cited

U.S. PATENT DOCUMENTS

2016/0350264 A1    12/2016  Lo et al.
2020/0096349 A1*   3/2020   Black ................... G01C 21/383
2021/0312333 A1*   10/2021  Uchide .................. G06F 40/30

FOREIGN PATENT DOCUMENTS

| JP | 2019101959 A | 6/2019 |
| TW | 201642195 A | 12/2016 |
| WO | 2008029830 A1 | 3/2008 |
| WO | 2011036704 A1 | 3/2011 |
| WO | 2020144736 A1 | 7/2020 |

OTHER PUBLICATIONS

Office Action of Jul. 7, 2023, for corresponding TW Patent Application No. 110136241, pp. 1-11. (For concise explanation of relevance, see the relevance code on p. 11.).

* cited by examiner

FIG.3

FIRST DATA SET

| DATA NAME | CORRECT-ANSWER DATA | PRODUCT IMAGE | | PRICE | STATE | PRODUCT NAME/ PRODUCT INTRODUCTION | | CATEGORY | |
|---|---|---|---|---|---|---|---|---|---|
| | | DATA | CORRECT-ANSWER DATA | | | DATA | CORRECT-ANSWER DATA | DATA | CORRECT-ANSWER DATA |
| FIRST PRODUCT INFORMATION | 0.0 | aaa.bmp | 0.0 | 50,000 | GOOD | aaa.txt | 0.0 | SMARTPHONE | 0.0 |
| SECOND PRODUCT INFORMATION | 0.0 | bbb.bmp | 0.0 | 80,000 | POOR | bbb.txt | 0.0 | TELEVISION | 0.0 |
| ... | ... | ... | ... | ... | ... | ... | ... | ... | ... |
| n-TH PRODUCT INFORMATION | ... | ... | ... | ... | ... | ... | ... | ... | ... |

FIG.4

SECOND DATA SET

| DATA NAME | CORRECT-ANSWER DATA | PRODUCT IMAGE | | PRICE | STATE | PRODUCT NAME/ PRODUCT INTRODUCTION | | CATEGORY | |
|---|---|---|---|---|---|---|---|---|---|
| | | DATA | CORRECT-ANSWER DATA | | | DATA | CORRECT-ANSWER DATA | DATA | CORRECT-ANSWER DATA |
| THIRD PRODUCT INFORMATION | 1.0 | aaa.bmp | 0.0 | 50,000 | GOOD | aaa.txt | 0.0 | TELEVISION | 1.0 |
| SECOND PRODUCT INFORMATION | 0.0 | bbb.bmp | 0.0 | 80,000 | POOR | bbb.txt | 0.0 | TELEVISION | 0.0 |
| ... | ... | ... | ... | ... | ... | ... | ... | ... | ... |
| n-TH PRODUCT INFORMATION | ... | ... | ... | ... | ... | ... | ... | ... | ... |

LEARNING DEVICE, COMPUTER-READABLE INFORMATION STORAGE MEDIUM, AND LEARNING METHOD

CROSS-REFERENCE TO RELATED APPLICATION

The present application claims priority from Japanese Application JP 2020-219436 filed on Dec. 28, 2020, the content of which is hereby incorporated by reference into this application.

BACKGROUND OF THE INVENTION

1. Field of the Invention

The present disclosure relates to a learning device, a computer-readable information storage medium, and a learning method.

2. Description of the Related Art

In recent years, services such as online shopping, online auctions, and online flea markets are provided. On webpages (called "product pages" or "listing pages") on which those services are provided, product information on a product, for example, a product image, a product name, a product description, and a category, is displayed. Such product information is provided to a platform of the service by a seller or vendor of the product, for example.

There are technologies for supporting the creation of a product page. For example, in Japanese Patent Application Laid-open No. 2014-115912, there is disclosed a sales support device for retrieving, based on a product image received from a seller, a similar image from among images of products purchased in the past by the seller, and generating a product page including product information corresponding to the retrieved similar image.

SUMMARY OF THE INVENTION

Incidentally, in order for a purchaser to consider purchasing a product based on the product information, it is desired that the product information on the product, for example the product image, the product name, the product description, and the category, be consistent as a whole. However, there are cases in which the product information provided from the seller is not consistent.

It is an object of the present disclosure to provide a learning device, a machine learning model, and a learning method for determining whether product information provided from a seller is consistent.

According to at least one embodiment of the present disclosure, there is provided a learning device including at least one processor, the at least one processor being configured to: acquire first product information on a first product and acquire second product information on a second product from a memory in which a plurality of pieces of product information, each including a plurality of pieces of item data relating to a product, are stored in advance; generate third product information in which at least one piece of item data included in the first product information is replaced with a corresponding at least one piece of item data of the second product information; and cause a machine learning model to learn the third product information as inconsistent product information. The machine learning model is configured to determine, when a piece of product information is input, whether the piece of product information is consistent.

In at least one aspect of the present disclosure, the at least one processor is configured to acquire the second product information from a plurality of candidates of the second product based on a similarity degree between the first product and the plurality of candidates of the second product.

In at least one aspect of the present disclosure, the at least one processor is configured to acquire the second product information having the similarity degree which falls within a predetermined range.

In at least one aspect of the present disclosure, the at least one processor is configured to acquire the second product information having the similarity degree which is equal to or less than a predetermined threshold value.

In at least one aspect of the present disclosure, the at least one processor is further configured to: generate feature information on each of the plurality of items; acquire, based on the feature information on each of the plurality of items, a feature vector for the first product and for each of the plurality of candidates of the second product; and calculate the similarity degree based on a distance between the feature vector of the first product and the feature vector of each of the plurality of candidates of the second product.

In at least one aspect of the present disclosure, the machine learning model is configured to perform the determination for each of the plurality of items.

According to at least one embodiment of the present disclosure, there is provided a computer-readable information storage medium for causing a machine learning model to function on a computer which includes at least one processor, the computer-readable information storage medium causing the machine learning model to: determine, when a piece of product information including a plurality of pieces of item data relating to a product is input, whether the piece of product information is consistent, learn, as inconsistent product information, third product information generated by replacing at least one piece of item data included in first product information on a first product, which is acquired from a memory in which a plurality of pieces of product information each including a plurality of pieces of item data relating to a product are stored in advance, with a corresponding at least one piece of item data of second product information on a second product, which is acquired from the memory.

According to at least one embodiment of the present disclosure, there is provided a learning method including: acquiring first product information on a first product and second product information on a second product from a memory in which a plurality of pieces of product information each including a plurality of pieces of item data relating to a product are stored in advance; generating third product information in which at least one piece of item data included in the first product information is replaced with a corresponding at least one piece of item data of the second product information; and cause a machine learning model to learn the third product information as inconsistent product information. The machine learning model is configured to determine, when a piece of product information is input, whether the piece of product information is consistent.

According to the at least one embodiment of the present disclosure, it becomes easier to determine whether the product information provided from a seller is consistent.

BRIEF DESCRIPTION OF THE DRAWINGS

FIG. 3 is a table for showing an example of a first data set.

FIG. 4 is a table for showing an example of a second data set.

DETAILED DESCRIPTION OF THE INVENTION

[1. Outline of Determination System]

Figure 1:
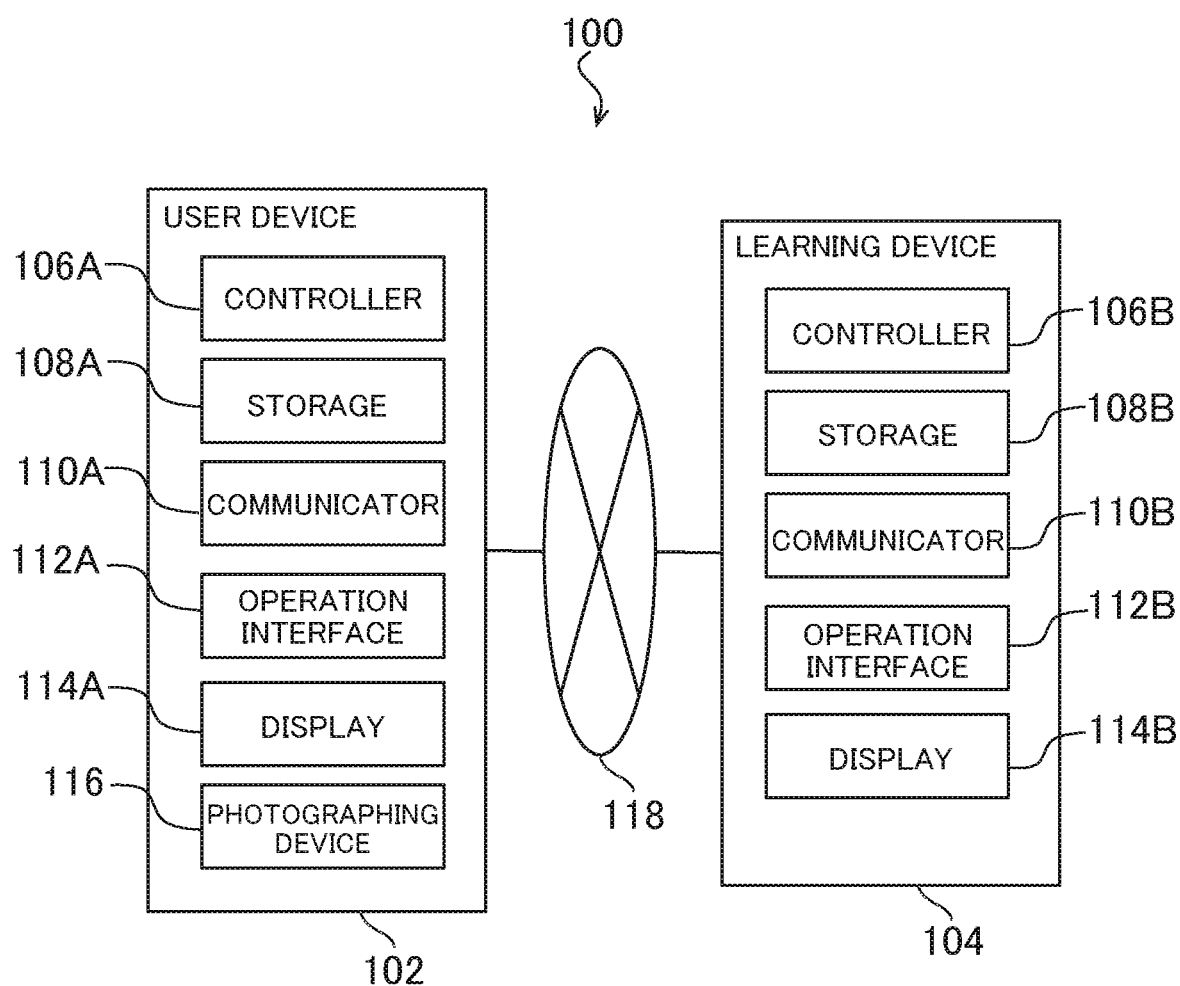
FIG. 1 is a diagram for illustrating an overall configuration of a determination system.

There is now described an example of at least one embodiment of a determination system 100 including a user device 102 and a learning device 104 in the present disclosure. FIG. is a diagram for illustrating an outline of a hardware configuration of the determination system 100. As illustrated in FIG. 1, the determination system 100 includes the user device 102 and the learning device 104, which are connected to a network 118 such as the Internet or a LAN. In FIG. 1, one user device 102 is illustrated, but there may be a plurality of user devices 102. Further, as described later, when the learning device 104 and a determination device 212 are configured separately, the determination system 100 includes the user device 102, the learning device 104, and the determination device 212.

The user device 102 is a computer to be operated by a user, for example, a seller. For example, the user device 102 is a personal computer, a portable information terminal (including a tablet computer and a wearable terminal), or a mobile phone (including a smartphone). For example, the user device 102 incudes a controller 106A, a storage 108A, a communicator 110A, an operation interface 112A, a display 114A, and a photographing device 116.

The controller 106A includes at least one processor. The controller 106A executes processing in accordance with programs and data stored in the storage 108A. The storage 108A includes a main memory and an auxiliary memory. For example, the main memory is a volatile memory, for example, a RAM, and the auxiliary memory is a non-volatile memory such as a ROM, an EEPROM, a flash memory, or a hard disk drive.

The communicator 110A is a communication interface for wired communication or wireless communication, and performs data communication via the network 118. The operation interface 112A is an input device to be used by an applicant to perform operation, and is, for example, a pointing device such as a touch panel and a mouse, a keyboard, or a button. The operation interface 112A transmits details of operation performed by the user to the controller 106A. The display 114A is, for example, a liquid crystal display or an organic EL display. The display 114A displays an image in accordance with an instruction of the controller 106A.

The photographing device 116 includes at least one camera. The photographing device 116 takes a photograph of a product as a subject. The photographing device 116 may generate a moving image in place of a still image.

The learning device 104 is a computer to be operated by an administrator providing a service, for example, online shopping, an online auction, or an online flea market. The learning device 104 is, for example, a server computer. The learning device 104 may be a personal computer, a portable information terminal (including a tablet computer and a wearable terminal), or a mobile phone (including a smartphone).

For example, the learning device 104 includes a controller 106B, a storage 108B, a communicator 110B, an operation interface 112B, and a display 114B. The physical configuration of each of the controller 106B, the storage 108B, the communicator 110B, the operation interface 112B, and the display 114B may be the same as that of the controller 106A, the storage 108A, the communicator 110A, the operation interface 112A, and the display 114A, respectively, included in the user device 102.

Programs and data to be described as being stored into the storages 108A and 108B may be supplied thereto via the network 118. Further, the respective hardware configurations of the user device 102 and the learning device 104 are not limited to the above-mentioned examples, and various types of hardware can be applied thereto. For example, the hardware configuration may include a reader (e.g., an optical disc drive or a memory card slot) for reading a computer-readable information storage medium, or an input/output device (e.g., a USB port) for inputting and outputting data to/from an external device. For example, the program and the data stored in the information storage medium may be supplied to each of the computers through intermediation of the reader or the input/output device.

[2. Functions to be Implemented in Learning Device]

Figure 2:
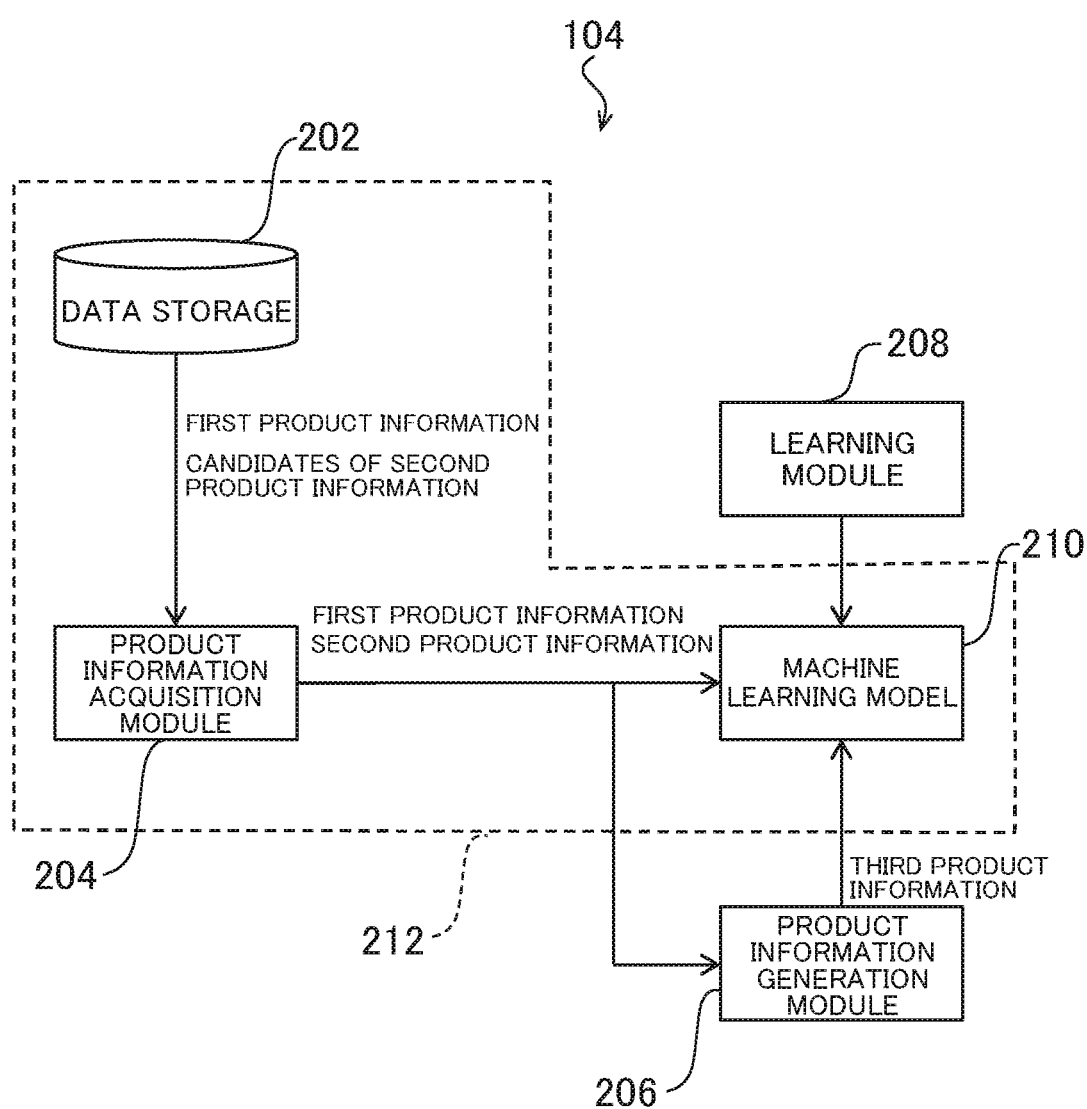
FIG. 2 is a function block diagram for illustrating an example of functions to be implemented by a learning device and a determination device.

FIG. 2 is a diagram for schematically illustrating a functional configuration of the learning device 104. As illustrated in FIG. 2, the learning device 104 includes a data storage 202, a product information acquisition module 204, a product information generation module 206, a learning module 208, and a machine learning model 210.

A program included in the machine learning model 210 defines processing content (instructions or calculation formulae) to be executed by the computer. For example, the program includes codes for performing convolution and pooling processing. A parameter includes at least one numerical value adjusted by learning, and for example, includes a numerical value of a weighting coefficient or a bias. The machine learning model 210 before learning includes a parameter having an initial value. The machine learning model 210 which has performed learning includes a parameter adjusted by the learning.

In the determination system 100, the machine learning model 210 is learned, and a determination is performed by using the machine learning model 210. In the present disclosure, there is described a mode in which the learning device 104 for performing learning and the determination device 212 including the machine learning model 210 are integrated, but the learning device 104 and the determination device 212 may be configured separately.

The data storage 202 stores in advance a plurality of pieces of product information each including a plurality of pieces of item data relating to a product. Specifically, for example, the data storage 202 stores in advance a first data set including product information on a plurality of products from a first product to an n-th product, as shown in FIG. 3.

In the at least one embodiment, each piece of product information includes data representing a data name, a product image, a price, a state, a product name/product introduction, and a category.

The data name is data for identifying the product information of each product. For example, the data name for identifying the product information relating to the first product is first product information. Similarly, the data names for identifying the product information relating to the products from the second product to the n-th product are second product information to n-th product information, respectively.

The product image is image data obtained by photographing the product. Specifically, for example, the product image is image data "aaa.bmp" in bitmap format obtained by photographing the first product, which is a smartphone, and image data "bbb.bmp" in bitmap format obtained by photographing the second product, which is a television. The product image is not limited to a bitmap format, and may be a still image or a moving image in another format acquirable by the product information acquisition module 204.

The price is numerical data representing a sales price of the product. For example, the price of the first product, which is a smartphone, is "50,000", and the price of the second product, which is a television, is "80,000". Note that, the units of the price are yen, but in the above-mentioned examples, the price is numerical data which does not include the units.

The state is data representing a storage state of the product. Specifically, for example, the state of the first product is "good", and the state of the second product is "poor". The state may be character string data such as "good", "slightly poor", or "poor", or may be numerical data classified into six stages in accordance with the storage state.

The product name/product introduction is character string data relating to description given by the seller to a viewer of the product page, for example, the product name, specifications, and date of manufacture of the product. Specifically, for example, the product name of the first product is the product name of the smartphone (for example, model number), and the product name of the second product is the product name of the television (for example, model number). Further, the product introduction of the first product is text data of, for example, the specifications of the smartphone such as an installed OS, the manufacturer, and the date of manufacture. The product introduction of the second product is text data of, for example, the specifications of the television such as a screen size, the manufacturer, and the date of manufacture.

The category is information representing a classification of a product field to which the product belongs. Specifically, for example, on the top page of the service, a list of categories is displayed so that the user can easily search for a product. The category is data representing an item in the list of the categories, and is a classification of the product field which is used by the user to search for a product. The category may be character string data representing a specific product, for example, "smartphone" or "television", or may be character string data representing an attribute of a target customer layer, for example, "ladies'" or "men's". Further, the category may be numerical data set in advance corresponding to the specific product or attribute.

Further, the product image, the product name/product introduction, and the category are associated with correct-answer data together with data representing the actual situation of each of the product image, the product name/product introduction, and the category. The correct-answer data for each item is a flag indicating whether or not the data of each item is consistent with the data of another item in the product information. For example, as the correct-answer data, a value of "0.0" is set when the data of the item is consistent with the data of the another item, and a value of "1.0" is set when the data of the item is not consistent with the data of the another item. The correct-answer data may be set by the administrator confirming the product information, or a determination result output by the machine learning model 210 described later may be set as the correct-answer data.

Here, "consistent" means whether each item is socially accepted as corresponding to other items. Specifically, for example, when the product image data "aaa.bmp" is image data obtained by photographing a smartphone, and the product name/product introduction data is character string data containing description about a smartphone, but the category data is data representing a different product category, for example, a "car" or a "bag", the category data is not socially accepted as corresponding to the product image data and the product name/product introduction data. Consequently, in such a case, "1.0" is set as the correct-answer data of the category.

The number of inconsistent items included in the product information is less than half of the number of items for which there is correct-answer data of each piece of product information (one row of product information shown in FIG. 3). That is, the correct-answer data of half or more of the items for which there is correct-answer data of each piece of product information is "0.0". For example, in the example shown in FIG. 3, out of the three items of the product image, the product name/product introduction, and the category for which there is correct-answer data, the pieces of correct-answer data of two items or more are "0.0". Items set as not being consistent are determined not to be consistent at least in relation to the items having "0.0" as the correct-answer data.

Each piece of product information may include not only the correct-answer data associated with the data of each item, but also include overall correct-answer data representing whether or not the product information is consistent as a whole (second column of FIG. 3). The overall correct-answer data is "0.0" when the pieces of correct-answer data associated with each item are all "0.0", and is "1.0" when one or more items is "1.0". Further, as the overall correct-answer data, the determination result output by the machine learning model 210 described later may be set.

Through input of product information on products to be sold by a plurality of users in advance to the user device 102, the learning device 104 acquires a plurality of pieces of product information. The data storage 202 stores in advance a plurality of pieces of product information each including a plurality of pieces of item data relating to a product. The data storage 202 is described below as storing in advance a first data set like that shown in FIG. 3.

The product information acquisition module 204 acquires first product information on a first product and second product information on a second product from the data storage 202. Specifically, the product information acquisition module 204 acquires the first product information on the first product. In addition, the product information acquisition module 204 acquires the second product information from a plurality of candidates of the second product based on a similarity degree between the first product and the plurality of candidates of the second product.

For example, first, the product information acquisition module 204 acquires the first product information on the first product, which is a smartphone. The product information acquisition module 204 may randomly acquire the first product information from the product information included in the first dataset, but in this example, the product information acquisition module 204 acquires product information which is consistent (that is, product information in which pieces of included correct-answer data are all "0.0"). The product information acquisition module 204 also acquires product information for each of the plurality of candidates of the second product from the first data set. Further, the product information acquisition module 204 acquires the second product information on the second product, which is a television, based on the similarity degree of the second product with the first product from among the candidates. As the second product information, product information different from the first product information included in the first data set is acquired. The method of selecting the second product information is described later.

The product information generation module 206 generates third product information in which one piece of item data in the first product information is replaced with the corresponding item data of the second product information. Specifically, for example, the product information generation module 206 generates third product information in which the data "smartphone" of the category in the first product information is replaced with the data "television" in the category of the second product information. Further, the product information generation module 206 generates a second data set in which the first product information included in the first data set is replaced with the third product information (refer to FIG. 4). The item to be replaced is selected at random. A plurality of items may be replaced, as long as the number of items to be replaced is less than half of the number of items for which there is correct-answer data of each piece of product information.

The second data set may be a data set in which the generated third product information is added to the first data set. Further, there may be a plurality of pieces of inconsistent product information generated by the product information generation module 206, and in this case, the second dataset includes a plurality of pieces of inconsistent product information.

The learning module 208 causes the machine learning model 210, which determines, when a piece of product information is input, whether or not the piece of product information is consistent, to learn the third product information as inconsistent product information. The machine learning model 210 is a known neural network, for example, a convolutional neural network (CNN). The machine learning model 210 calculates feature information on the product information when a feature vector (described later) of the product is input, and outputs a determination result corresponding to the feature information. The feature information is represented by at least one numerical value indicating a feature of the input data. The feature information is usually represented by a multidimensional vector, but may be expressed in another format, for example, an array format or a single numerical value. The learning performed by the learning module 208 on the machine learning model 210 is described later.

[3. Selection of Second Product Information]

Figure 5:
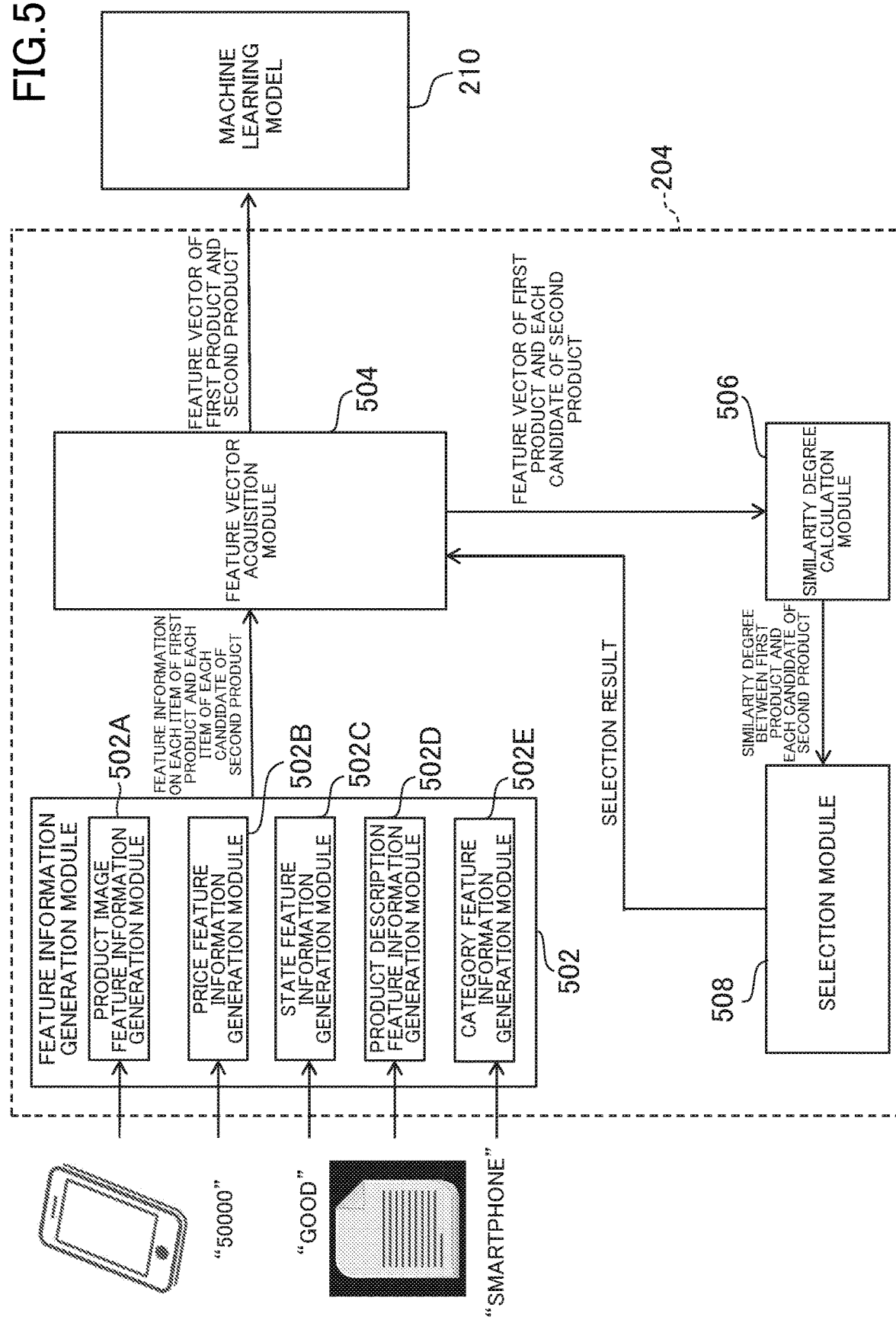
FIG. 5 is a function block diagram for illustrating an example of functions of a product information acquisition module.

Next, there is described an example of the method of selecting the second product information from the plurality of pieces of product information included in the first data set. FIG. 5 is a diagram for illustrating an outline of a functional configuration of the product information acquisition module 204. The product information acquisition module 204 includes a feature information generation module 502, a feature vector acquisition module 504, a similarity degree calculation module 506, and a selection module 508.

The feature information generation module 502 generates feature information on each item. A feature amount may be expressed in any number of dimensions. The method of calculating the feature amount itself by the feature information generation module 502 can be a known method, and, for example, convolution, pooling, or the like using a filter in which a weighting coefficient is set is performed.

Specifically, for example, the feature information generation module 502 includes each module for generating the feature information for each item included in the product information when the data of the item is input. In the example described above, the feature information generation module 502 includes a product image feature information generation module 502A, a price feature information generation module 502B, a state feature information generation module 502C, a product description feature information generation module 502D, and a category feature information generation module 502E.

The product image feature information generation module 502A generates feature information of a product image when the data of the product image is input. The price feature information generation module 502B generates feature information of a price when the data of the price is input. The state feature information generation module 502C generates feature information of a state when the data of the state is input. The product description feature information generation module 502D generates feature information of product name/product introduction when the data of the product name/product introduction is input. The category feature information generation module 502E generates feature information of a category when the data of the category is input.

Each module included in the feature information generation module 502 may generate feature information corresponding to the input data by using existing technology. Specifically, for example, the product image feature information generation module 502A may include a machine learning model learned by using a standard dataset of images prepared for image recognition research, and may set a feature vector calculated by the machine learning model as feature information of the product image. The price feature information generation module 502B may set, as feature information of the price, for example, a ratio with respect to an average value of the market prices of the product or a ratio with respect to an average value of pieces of data of the price included in the product information belonging to the same category of the first data set. The state feature information generation module 502C may refer to a table classified into six stages in accordance with a storage state set in advance, and set the value corresponding to the state as feature information of the state. The product description feature information generation module 502D may include a machine learning model which converts a sentence of any length learned by using an online dictionary or a corpus available on the general market into a fixed-length vector, and set a feature vector calculated by the machine learning model as feature information of the product name/product introduction. The category feature information generation module 502E may set a value set in advance in accordance with a position of the category in tree structure as feature information of the category.

The feature information generated by each module included in the feature information generation module 502 may be a scalar amount or a vector amount. As well as generating feature information based on the first product, the feature information generation module 502 also generates feature information based on the product information on the plurality of candidates of the second product randomly selected from the first data set.

The feature vector acquisition module 504 acquires, based on the feature information on each item, a feature vector for the first product and for each of the plurality of candidates of the second product. Specifically, for example, the feature vector acquisition module 504 generates a single feature vector by connecting pieces of feature information on each item generated by the respective modules included in the feature information generation module 502. The method of generating the feature vector may performed by simply connecting each piece of feature information from the product image to the category to generate the feature vector, or by another known method to generate the feature vector. The feature vector acquisition module 504 acquires the feature vector of the first product and the feature vectors of a plurality of candidates of the second product selected at random.

The similarity degree calculation module 506 calculates the similarity degree between the first product and the plurality of candidates of the second product. Specifically, for example, the similarity degree calculation module 506 calculates a distance in Euclidean space between the feature vector of the first product and the feature vector of each of the plurality of candidates of the second product. Then, the similarity degree calculation module 506 calculates the similarity degree between the first product and each of the candidates of the second product based on the calculated distance. For example, the similarity degree calculation module 506 may set a value obtained by multiplying a predetermined constant by the reciprocal of the calculated distance as the similarity degree between the first product and each of the candidates of the second product so that the similarity degree becomes larger as the distance becomes shorter and the similarity degree becomes smaller as the distance becomes longer. That is, the first and second products become more similar as the similarity degree between the first and second products becomes larger.

The similarity degree calculation module 506 may calculate the similarity degree based on the feature information on each item generated by the feature information generation module 502 and the data of each item, in place of a feature vector. For example, the similarity degree calculation module 506 identifies a node to which the first product and each second product candidate belongs in tree structure of the category. The similarity degree calculation module 506 may calculate a distance (for example, a lowest common ancestor (LCA)) between the node of the category of the first product and the node to which each second product candidate belongs, and calculate the similarity degree based on the calculated distance.

The selection module 508 selects the second product. Specifically, for example, when the similarity degree between the first product and the second product is too large, there are cases in which the product information on the third product is consistent as a whole. Consequently, to avoid the selection of a second product having too large a similarity degree with the first product, the selection module 508 acquires a second product having a similarity degree which is equal to or less than a threshold value set in advance from the plurality of candidates of the second product. When there are a plurality of candidates of the second product having a similarity degree which is equal to or less than the predetermined threshold value, the selection module 508 may randomly select a second product from among those candidates, may select the second product having the smallest similarity degree, or may select the second product having the largest similarity degree. As a result of acquiring a second product having a similarity degree which is equal to or less than the predetermined threshold value, it is possible to prevent the generation of product information on the third product which is consistent as a whole.

The selection module 508 may acquire the second product information having the similarity degree which falls within a range set in advance. Specifically, for example, the selection module 508 acquires a second product having the similarity degree which falls within a range set in advance from the plurality of candidates of the second product. When there are a plurality of candidates of the second product having the similarity degree which falls within the range set in advance, the selection module 508 may randomly select a second product from among those candidates, may select the second product having the smallest similarity degree, or may select the second product having the largest similarity degree.

Further, whether product information on a product having a similarity degree which falls within a predetermined range is acquired or whether product information on a product having a similarity degree equal to or less than a threshold value may be determined in accordance with the inconsistent product information which the administrator is thinking of (wants to detect). In the case of acquiring product information on a product having a similarity degree which falls within a predetermined range, a product suitably similar to the first product can be acquired as the second product by appropriately setting the predetermined range. Meanwhile, in the case of acquiring product information having a similarity degree equal to or less than a threshold value, a product which is not similar to the first product can be acquired as the second product by appropriately setting the threshold value.

Figure 6:
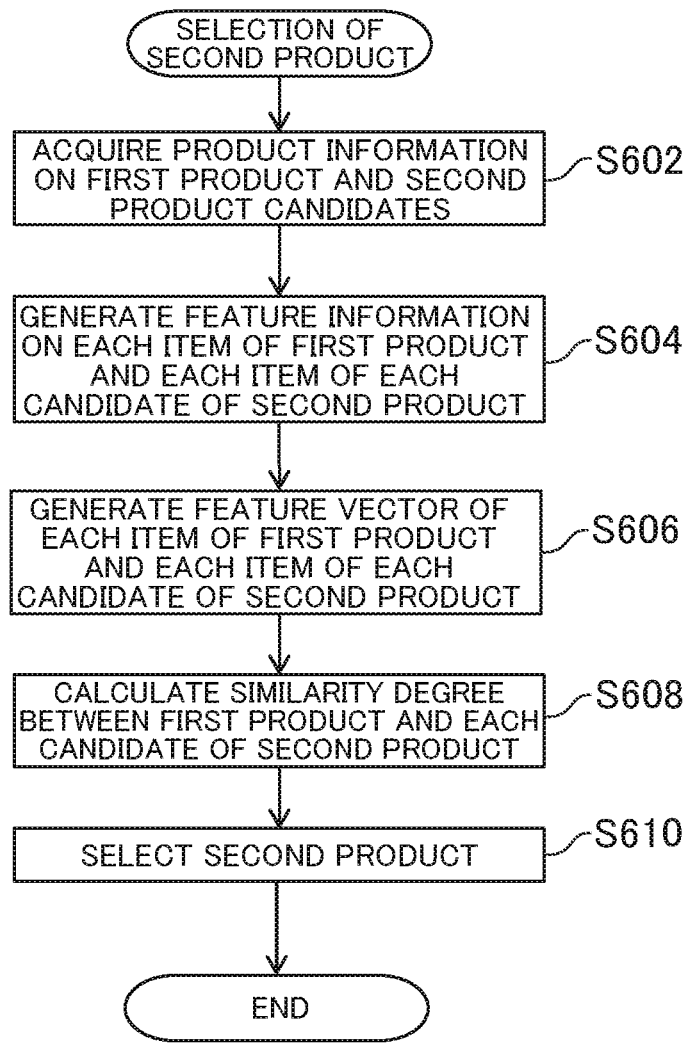
FIG. 6 is a flow chart for illustrating an example of processing for selecting a second product.

FIG. 6 is an example of a flow chart for illustrating a method of selecting the second product. First, the feature information generation module 502 acquires the product information on the first product and on a plurality of candidates of the second product (Step S602). Specifically, the feature information generation module 502 randomly acquires the product information on the first product and the product information on a plurality of candidates of the second product from the first data set.

Next, the feature information generation module 502 generates feature information from the data of each item included in the product information for all of the pieces of product information acquired in Step S602 (Step S604). Then, the feature vector acquisition module 504 generates and acquires a feature vector for the first product and for each of the plurality of candidates of the second product based on the feature information on each item (Step S606).

Next, the similarity degree calculation module 506 calculates a similarity degree based on the distance between the feature vector of the first product and the feature vector of each of the plurality of candidates of the second product acquired in Step S606 (Step S608). Further, the selection module 508 acquires, from the plurality of candidates of the second product, a second product having a similarity degree equal to or less than a threshold value set in advance (Step S610). The product information generation module 206 generates third product information based on the product information on the first product and the product information on the second product selected in Step S610. The generated third product information is stored in the data storage 202 as a part of the second data set. Note that, the selection method of the second product illustrated in FIG. 6 is an example, and the present disclosure is not limited to that method. For example, the second product may be randomly selected from the first data set.

[4. Learning Performed by Learning Device]

The learning device 104 in the at least one embodiment performs the learning of the machine learning model 210 as described above, and the determination system 100 uses the machine learning model 210 to determine whether or not the product information is consistent. Training data to be used for learning is the product information included in the second data set. The second data set is stored in the data storage 202. The training data is the individual data units to be learned by the machine learning model 210. Training data is sometimes referred to as "teacher data" or "learning data." For example, in the training data, input data and correct-answer data are associated with each other. That is, the training data is a pair of input data and correct-answer data. Each pair is training data, and a collection of those pairs is the second data set. The input data included in the training data is the feature vector acquired by the feature vector acquisition module 504. The input data has the same format (in the at least one embodiment, a feature vector) as that of the input data input to the machine learning model 210.

The correct-answer data is data indicating output which is the correct answer, and is included in each piece of product information. The output which is the correct answer is the content which is supposed to be output by the machine learning model 210 when input data is input (content desired to be output by the machine learning model 210). For example, the correct-answer data can also be data indicating a true value or a true value vector. The correct-answer data is sometimes referred to as "correct-answer information."

For example, as shown in FIG. 4, the data "television" included in the second product information, which is a correct example, is associated with correct-answer data indicating "0.0" (a true value indicating a correct example) corresponding to consistency. The data "television" included in the third product information, which is an incorrect example, is associated with correct-answer data indicating "1.0" (a true value indicating an incorrect example) corresponding to inconsistency.

In the at least one embodiment, the correct-answer data included in the second dataset is the correct-answer data of the product image, the correct-answer data of the product name/product introduction, and the correct-answer data of the category. For example, the input data of the third product information in the second data set is associated with correct-answer data indicating [0.0, 0.0, 1.0]. The input data of the second product information in the second data set is associated with correct-answer data indicating [0.0, 0.0, 0.0].

The learning module 208 sequentially inputs the feature vectors generated from the product information, which are a plurality of pieces of training data, to the machine learning model 210, which determines whether each item is consistent, and performs the learning of the machine learning model 210 based on the correct-answer data corresponding to the product data. In the at least one embodiment, there is described a case in which the input order of the input data is defined in advance, but the input order of the input data may be determined at random.

Figure 7:
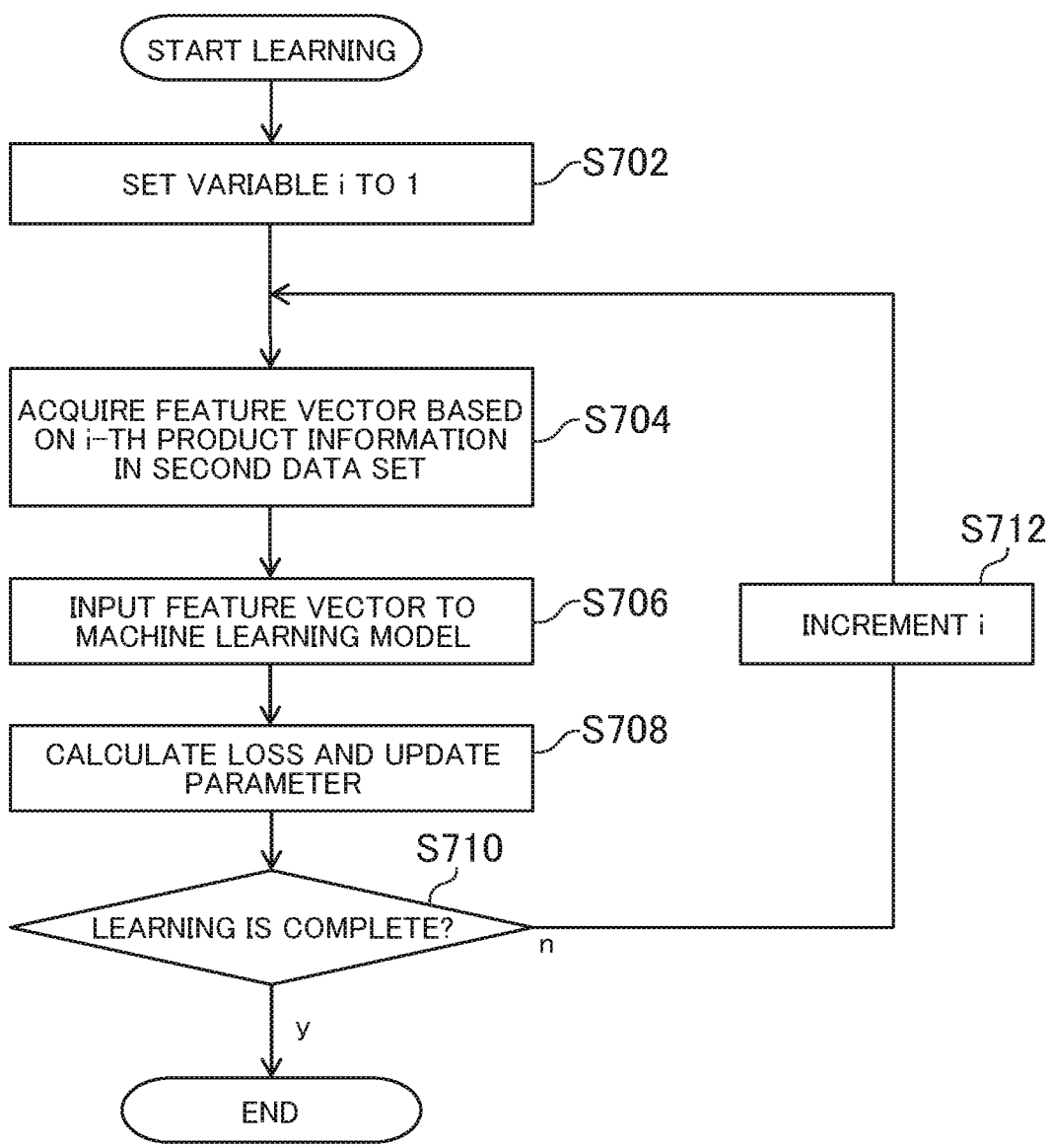
FIG. 7 is a flow chart for illustrating an example of learning processing to be executed by the learning device.

FIG. 7 is an example of a flow chart for illustrating a learning method. First, a variable "i" representing an order of the product information to be used in learning is set to "1" (Step S702). Then, the feature vector acquisition module 504 acquires a feature vector based on the i-th product information included in the second data set (Step S704). For example, in a case in which the first product information is that the product image data is "aaa.bmp", the price data is "50,000", the state data is "good", the product name/product introduction data is "aaa.txt", and the category data is "television", when "i" is 1, the feature vector acquisition module 504 acquires a feature vector based on the first product information.

The learning module 208 inputs the feature vector acquired in Step S704 to the machine learning model 210 (Step S706). In the at least one embodiment, the machine learning model 210 is described as a machine learning model 210 implemented by a convolutional neural network (CNN). When the feature vector is input, the machine learning model 210 outputs the determination results relating to the overall product information, the product image, the product name/product introduction, and the category as a three-dimensional vector. That is, the machine learning model 210 performs a determination for each item. The value of each dimension included in the three-dimensional vector is a probability of from "0.0" to "1.0" representing whether each piece of data is consistent. Each value is "0.0" when the data of each item is determined to be consistent, and "1.0" when the data of each item is determined to be inconsistent.

Next, the learning module 208 calculates a loss and updates an internal parameter of the machine learning model 210 (Step S708). Specifically, the learning module 208 calculates the loss based on the determination results represented by the three-dimensional vector output when the feature vector is input to the machine learning model 210 and the correct-answer data corresponding to the input data. More specifically, for example, the input data of the third product information in the second data set is associated with correct-answer data indicating [0.0, 0.0, 1.0]. The learning module 208 calculates the loss by using a three-dimensional vector representing the determination results output in Step S706 and a three-dimensional vector of the correct-answer data. The loss calculation method itself can be a known calculation method, for example, sum of squares error or cross entropy. Further, the learning module 208 updates the internal parameter of the machine learning model 210 such that the calculated loss decreases. The internal parameter is an internal constant of the machine learning model 210, and is, for example, a value to be used for weighting of each node.

When the parameter is updated, "i" is incremented (Step S712), and the parameter is updated by using the next product information. The learning module 208 repeats the learning of the machine learning model 210 until the loss becomes sufficiently smaller (for example, the loss becomes lesser than a threshold value). The learning module 208 may end the learning at the point at which the loss becomes sufficiently small during learning. Even when the loss has not become sufficiently smaller, the learning module 208 may end the learning when a predetermined number of times of learning have been repeated. Further, the learning may be ended when the variable "i" becomes the same as the number of pieces of product information included in the second data set. As the learning method (parameter adjustment method) itself, a known method is applicable, and another method may be used.

There has been described a case in which learning is executed by using the correct-answer data for each item, but learning may be performed by using correct-answer representing whether or not product information is consistent as a whole. Specifically, learning may be performed by using the correct-answer data associated with the data name in the second data set shown in FIG. 4. The correct-answer data associated with the data name is set to a value of "1.0" when at least one of pieces of correct-answer data of each item included in the product information is "1.0". That is, the correct-answer data associated with the data name is set to a value of "0.0" when the pieces of correct-answer data of the items included in the product information are all "0.0". Through execution of such learning, the machine learning model 210 can determine whether or not the product information is consistent as a whole in place of performing a determination for each item.

In the learning device 104 during learning, the data storage 202 is mainly implemented by the storage 108B, and the product information acquisition module 204, the product information generation module 206, the learning module 208, and the machine learning model 210 are each mainly implemented by the controller 106B.

[5. Determination Performed by Determination Device]

Figure 8:
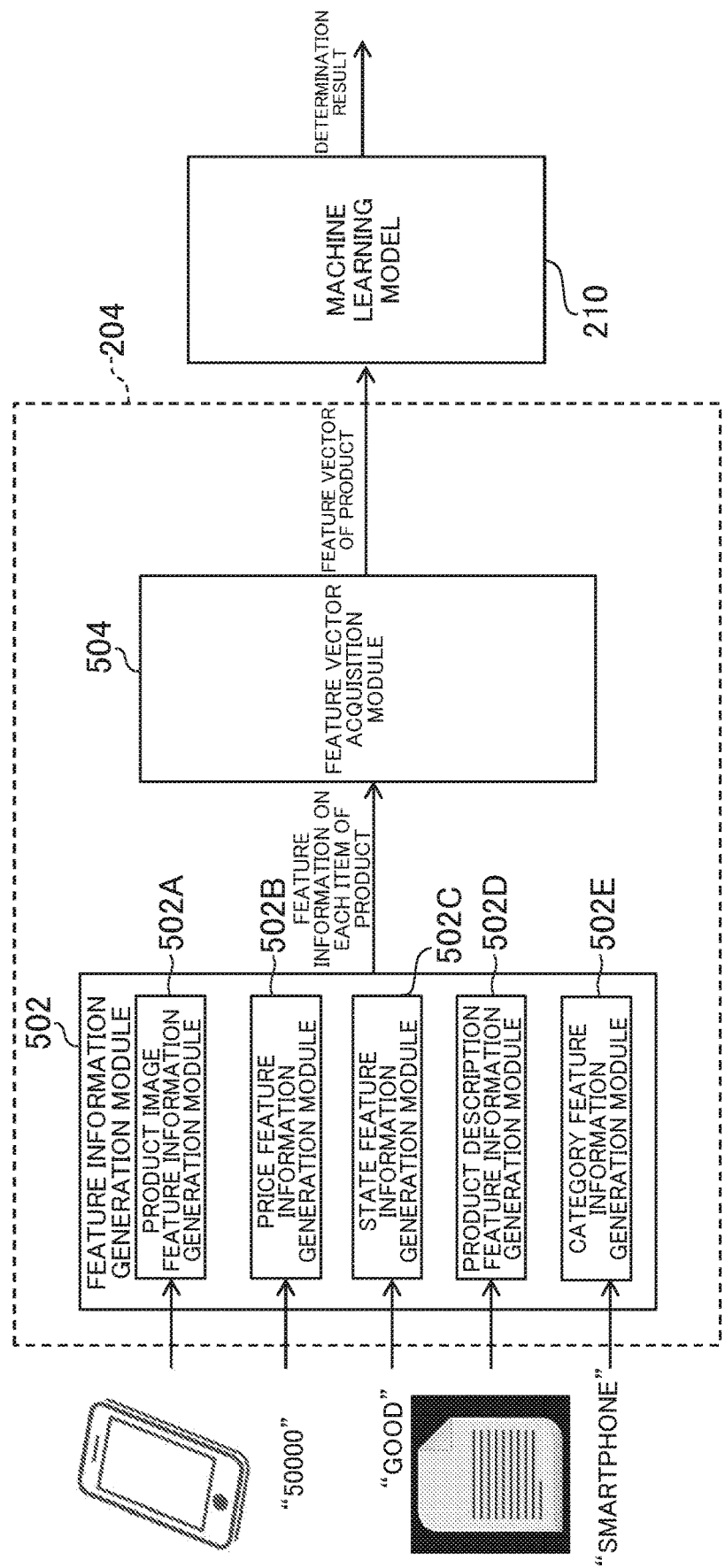
FIG. 8 is a function block diagram for illustrating an example of functions of the product information acquisition module.
Figure 9:
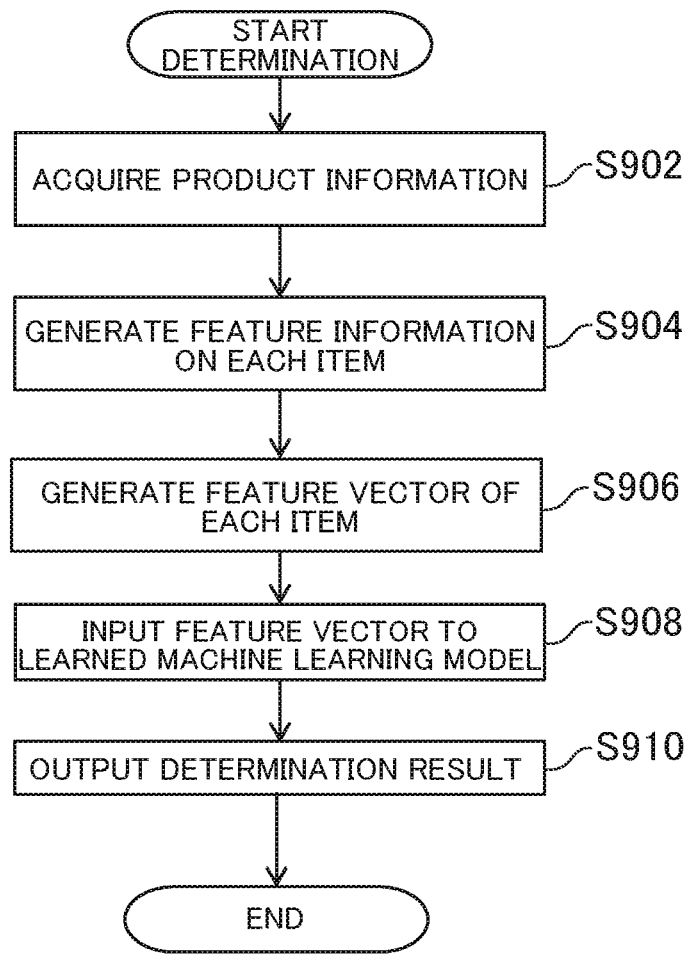
FIG. 9 is a flow chart for illustrating an example of determination processing to be executed by the determination device.

The learned learning device 104 can be used as the determination device 212 which determines whether or not the product information is consistent. The determination device 212 is not required to include all of the parts of the learning device 104 illustrated in FIG. 2. Of the various parts of the learning device 104 illustrated in FIG. 2, it is sufficient for the determination device 212 to include at least the data storage 202, the product information acquisition module 204, and the machine learning model 210. Further, as illustrated in FIG. 8, it is sufficient for the product information acquisition module 204 included in the determination device 212 to include at least the feature information generation module 502 and the feature vector acquisition module 504. The machine learning model 210 has been trained in accordance with the flow illustrated in FIG. 7. The determination performed by the determination device 212 including the machine learning model 210 is now described with reference to FIG. 8 and a flow chart illustrated in FIG. 9.

First, the product information acquisition module 204 acquires the product information (Step S902). Specifically, the user who is trying to sell the product inputs the product information on the product to be sold to the user device 102. The product information acquisition module 204 acquires the product information input by the user via the network 118.

Next, the feature information generation module 502 generates feature information on each item based on the product information acquired in Step S902 (Step S904). Then, the feature vector acquisition module 504 generates a feature vector based on the feature information on each item (Step S906). Here, Step S904 and Step S906 are steps of generating the feature information and the feature vector of each item in a manner similar to Step S604 and Step S606.

Next, the generated feature vector is input to the machine learning model 210 (Step S908), and the machine learning model 210 outputs the determination results (Step S910). In the example described above, the determination results are represented by a three-dimensional vector. For example, when the determination results are [0.0, 0.0, 1.0], the determination results indicate that the product image and the product name/product introduction are consistent, but the category is not consistent.

The determination device 212 may be configured to issue an error message or a warning to the administrator when the determination results indicate that there is an inconsistency. Further, the determination device 212 may notify the user device 102 via the network 118 that the determination results indicate that there is an inconsistency. The user device 102 that has received the notification may display an error message, a warning, or a message prompting correction or confirmation on the display 114A. At this time, as a result of the machine learning model 210 performing a determination for each item, the user device 102 and the determination device 212 can notify the user or administrator of the inconsistent item and prompt confirmation or correction of that item.

In the determination device 212, the data storage 202 is mainly implemented by the storage 108B, and the product information acquisition module 204 and the machine learning model 210 are each mainly implemented by the controller 106B.

According to the at least one embodiment of the present disclosure, as described above, an administrators can easily distinguish a piece of product information that is not consistent from among pieces of product information provided by many sellers. In addition, in many cases, the product information input by the user is consistent, and therefore it is difficult to collect inconsistent product information for training data to be used for learning. When there is not enough inconsistent product information in the training data compared with consistent product information, learning efficiency may decrease, and the determination accuracy of a machine learning model obtained as a result of the learning may be reduced. According to the at least one embodiment of the present disclosure, inconsistent product information can be easily created, and hence it can be expected to improve learning efficiency and improve the determination accuracy of a machine learning model.

The present disclosure is not limited to the at least one embodiment described above, and can be modified suitably without departing from the spirit of the present disclosure.

For example, in a configuration in which the second product information is randomly selected, the product information acquisition module 204 is not required to include the selection module 508 and the similarity degree calculation module 506.

Further, in a configuration in which the machine learning model 210 is a model capable of receiving data for each item, the machine learning model 210 may be integrated with the feature information generation module 502 and the feature vector acquisition module 504.

Moreover, there has been described a case in which the product information includes information representing each of the data name, the product image, the price, the state, the product names/product introduction, and the category, but the product information may include a part of those piece of information, and may even include information on another item.

Further, there has been described a case in which the user device 102 and the learning device 104 are included in the determination system 100, but the user device 102 and the learning device 104 may exist in separate systems. In this case, as described above, the learning device 104 includes the data storage 202, the product information acquisition module 204, the product information generation module 206, the learning module 208, and the machine learning model 210, and each of those parts is implemented by a computer which implements functions as a learning device. Meanwhile, the determination device 212 includes the data storage 202, the product information acquisition module 204, and the machine learning model 210 which has undergone learning, and each of those parts is implemented by a computer different from the computer which implements functions as a learning device. In addition, the data described as being stored in the data storage 202 may be stored in another computer or an information storage medium different from the user device 102 and the learning device 104.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A learning device comprising at least one processor, the at least one processor being configured to:
    acquire first product information on a first product and acquire second product information on a second product from a memory in which a plurality of pieces of product information, each including a plurality of pieces of item data relating to a product, are stored in advance;
    generate third product information in which at least one piece of item data included in the first product information is replaced with a corresponding at least one piece of item data of the second product information;
    cause a machine learning model to learn the third product information as inconsistent product information, wherein the machine learning model is configured to determine, when a piece of product information is input, whether the piece of product information is consistent;
    acquire the second product information from a plurality of candidates of the second product based on a similarity degree between the first product and the plurality of candidates of the second product; and
    acquire the second product information having the similarity degree which is equal to or less than a predetermined threshold value.

2. The learning device according to claim 1, wherein the at least one processor is configured to acquire the second product information having the similarity degree which falls within a predetermined range.

3. The learning device according to claim 1, wherein the at least one processor is further configured to:
    generate feature information on each of the plurality of items;
    acquire, based on the feature information on each of the plurality of items, a feature vector for the first product and for each of the plurality of candidates of the second product; and
    calculate the similarity degree based on a distance between the feature vector of the first product and the feature vector of each of the plurality of candidates of the second product.

4. The learning device according to claim 1, wherein the machine learning model is configured to perform the determination for each of the plurality of items.

5. The learning device according to claim 1, wherein the piece of product information is determined to be consistent when the item data in the input product information corresponds to the other pieces of item data in the input product information.

6. A computer-readable information storage medium for causing a machine learning model to function on a computer which includes at least one processor, the computer-readable information storage medium causing the machine learning model to:
    determine, when a piece of product information including a plurality of pieces of item data relating to a product is input, whether the piece of product information is consistent,
    learn, as inconsistent product information, third product information generated by replacing at least one piece of item data included in first product information on a first product, which is acquired from a memory in which a plurality of pieces of product information each including a plurality of pieces of item data relating to a product are stored in advance, with a corresponding at least one piece of item data of second product information on a second product, which is acquired from the memory;
    wherein the second product information is acquired from a plurality of candidates of the second product based on a similarity degree between the first product and the plurality of candidates of the second product;
    wherein the second product information is acquired having the similarity degree which is equal to or less than a predetermined threshold value.

7. A learning method, comprising:
    acquiring first product information on a first product and second product information on a second product from a memory in which a plurality of pieces of product information each including a plurality of pieces of item data relating to a product are stored in advance;
    generating third product information in which at least one piece of item data included in the first product information is replaced with a corresponding at least one piece of item data of the second product information;
    cause a machine learning model to learn the third product information as inconsistent product information, wherein the machine learning model is configured to determine, when a piece of product information is input, whether the piece of product information is consistent;
    acquiring the second product information from a plurality of candidates of the second product based on a similarity degree between the first product and the plurality of candidates of the second product; and
    acquiring the second product information having the similarity degree which is equal to or less than a predetermined threshold value.

* * * * *